United States Patent
Lam et al.

(10) Patent No.: US 10,085,075 B2
(45) Date of Patent: *Sep. 25, 2018

(54) MESSAGING BETWEEN SET TOP BOX AND HEAD END SYSTEMS

(71) Applicant: The DIRECTV Group, Inc., El Segundo, CA (US)

(72) Inventors: Thai Lam, Cypress, CA (US); Christopher J. Cugno, Anaheim Hills, CA (US); Sivasubramanian Venkataramani, Cerritos, CA (US); Michael Shu Xie, Hacienda Heights, CA (US); Ying Sheng, San Gabriel, CA (US)

(73) Assignee: THE DIRECTV GROUP, INC., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/364,059

(22) Filed: Nov. 29, 2016

(65) Prior Publication Data

US 2017/0078764 A1    Mar. 16, 2017

Related U.S. Application Data

(63) Continuation of application No. 14/629,145, filed on Feb. 23, 2015, now Pat. No. 9,538,259.

(51) Int. Cl.
*H04N 21/81* (2011.01)
*H04N 21/2381* (2011.01)
(Continued)

(52) U.S. Cl.
CPC ........ *H04N 21/8126* (2013.01); *H04H 20/38* (2013.01); *H04H 20/51* (2013.01);
(Continued)

(58) Field of Classification Search
CPC ............. H04L 61/1541; H04L 12/5815; H04L 61/2564; H04L 61/304; H04L 63/08;
(Continued)

(56) References Cited

U.S. PATENT DOCUMENTS

| 2008/0192770 A1 | 8/2008 | Burrows et al. |
| 2010/0162294 A1 | 6/2010 | Yin et al. |

(Continued)

OTHER PUBLICATIONS

Millard, R, et al., "XEP-0060: Publish Subscribe", Jul. 12, 2010, © 1999-2012 XMPP Standards Foundation.

*Primary Examiner* — Hai V Tran
(74) *Attorney, Agent, or Firm* — Gates & Cooper LLP

(57) ABSTRACT

A system, apparatus, and method provide messaging, between a headend system and a set top box. A distributor determines and provides an assigned communication identifier and an assigned server host address, that correspond to one of one or more first servers, to each of one or more set top box clients. The first servers maintain a persistent connection with the set top box clients and provide messaging, presence, and routing features via the persistent connection. A gateway service provides a gateway for one or more headend servers to communicate with the set top box clients through the first servers. A server controller provides administrative graphical user interfaces for operators to monitor and control health checks, configuration changes, and collect statistics for the distributor, first servers, and the gateway service.

20 Claims, 8 Drawing Sheets

(51) Int. Cl.

| | |
|---|---|
| *H04N 21/647* | (2011.01) |
| *H04N 21/222* | (2011.01) |
| *H04N 21/2665* | (2011.01) |
| *H04N 21/462* | (2011.01) |
| *H04H 40/90* | (2008.01) |
| *H04H 20/38* | (2008.01) |
| *H04H 20/51* | (2008.01) |
| *H04N 7/173* | (2011.01) |
| *H04H 20/74* | (2008.01) |
| *H04N 21/61* | (2011.01) |
| *H04L 29/08* | (2006.01) |
| *H04L 29/06* | (2006.01) |
| *H04N 21/239* | (2011.01) |
| *H04N 21/643* | (2011.01) |
| *H04H 20/78* | (2008.01) |
| *H04N 7/20* | (2006.01) |

(52) U.S. Cl.
CPC ............ *H04H 20/74* (2013.01); *H04H 20/78* (2013.01); *H04H 40/90* (2013.01); *H04L 29/06* (2013.01); *H04L 65/1023* (2013.01); *H04L 67/02* (2013.01); *H04N 7/173* (2013.01); *H04N 7/20* (2013.01); *H04N 21/222* (2013.01); *H04N 21/239* (2013.01); *H04N 21/2381* (2013.01); *H04N 21/2665* (2013.01); *H04N 21/4622* (2013.01); *H04N 21/6193* (2013.01); *H04N 21/643* (2013.01)

(58) Field of Classification Search
CPC . H04L 65/1016; H04L 65/1036; H04L 67/16; H04L 65/104; H04L 69/08; H04N 7/17336

See application file for complete search history.

(56) References Cited

U.S. PATENT DOCUMENTS

| | | | |
|---|---|---|---|
| 2011/0041147 A1* | 2/2011 | Piepenbrink | H04N 21/25841 |
| | | | 725/28 |
| 2011/0320575 A1* | 12/2011 | Pope | H04N 21/8543 |
| | | | 709/220 |
| 2013/0013704 A1* | 1/2013 | Pope | H04L 61/1541 |
| | | | 709/206 |
| 2013/0272191 A1 | 10/2013 | Witzel | |
| 2014/0007174 A1 | 1/2014 | Kirby | |

* cited by examiner

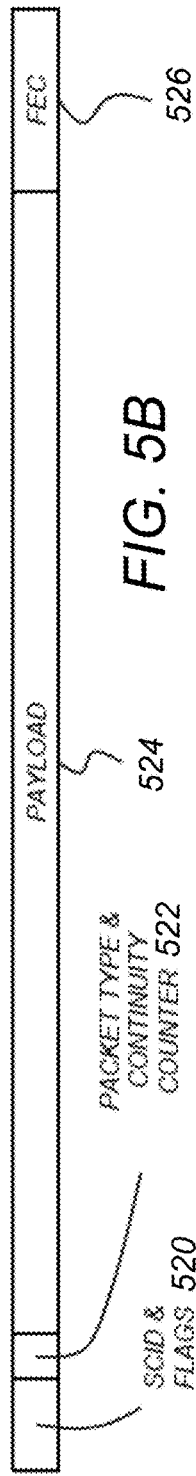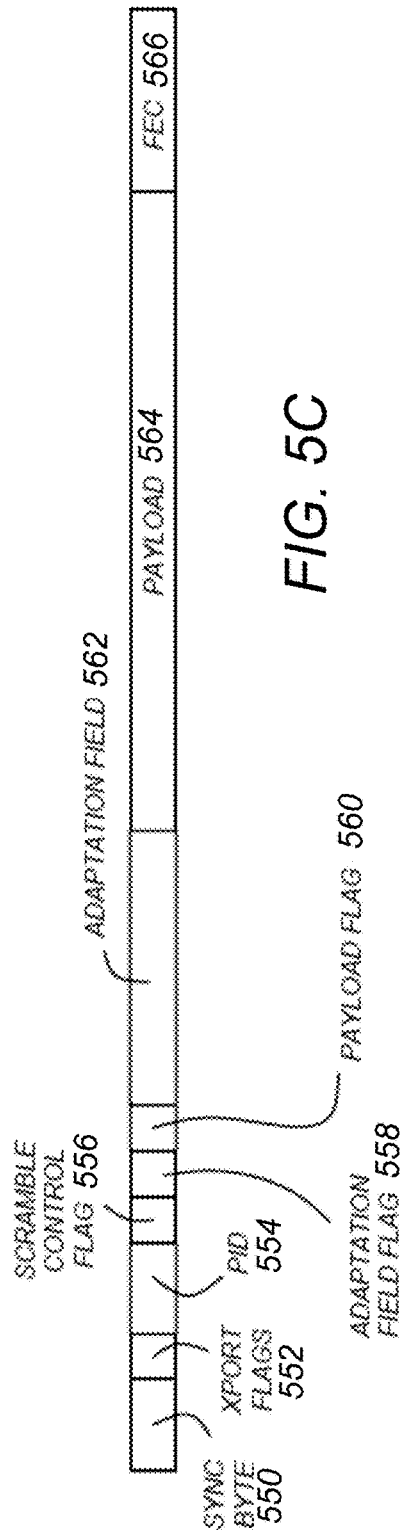

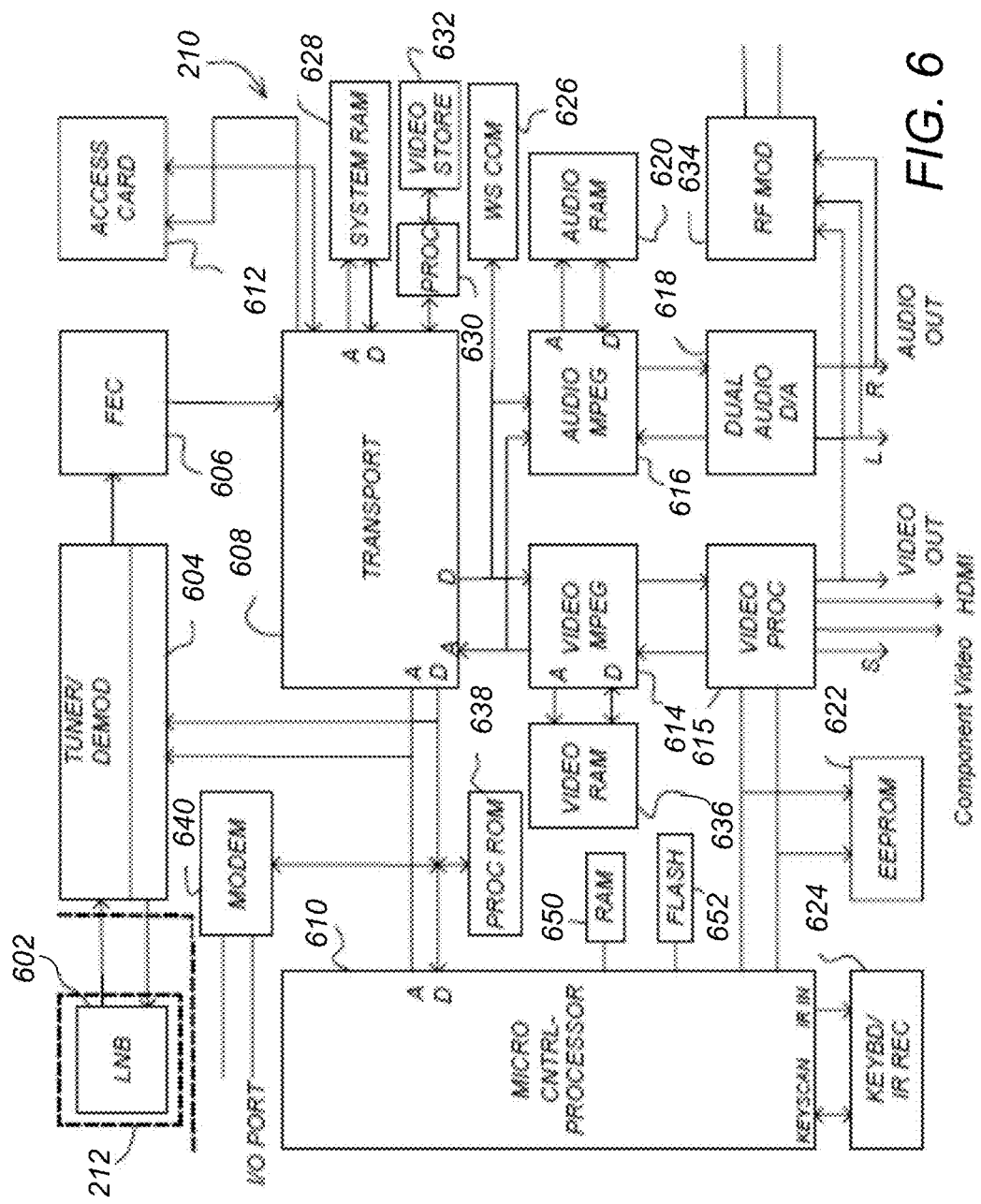

MESSAGING BETWEEN SET TOP BOX AND HEAD END SYSTEMS

CROSS-REFERENCE TO RELATED APPLICATIONS

This application is a continuation under 35 U.S.C. § 120 of application Ser. No. 14/629,145, filed on Feb. 23, 2015, with inventor(s) Thai Lam, Christopher J. Cugno, Sivasubramanian Venkataramani, Michael Shu Xie, and Ying Sheng, entitled "Messaging Between Set Top Box and Head End Systems," which application is incorporated by reference herein.

BACKGROUND

1. Technical Field

Embodiments of the present invention relates generally to broadcast programming systems, and in particular, to a method, apparatus, and article of manufacture for bi-directional messaging between a set top box and head end system within a broadcast programming system.

2. Description of the Related Art

Traditionally, customers access business websites (e.g., a customer visits a retailer's website or the website of a service that the customer utilizes such as a phone company, gas company, water and power company, etc.). Usually, businesses don't access a customer's home. In some circumstances, it would be beneficial for the business to contact a customer/client and/or access a customer's devices. For example, it may be desirable for a satellite television provider to control a customer's set top box (STB) that is used to access the provider's services/content. Such a provider may want to exchange/deliver configuration information to a STB such as parental controls, pause points (indicating where the user paused when watching/viewing content on another device such as a phone), and/or other configuration information. There is insufficient bandwidth to deliver such configuration information over a broadcast signal (e.g., via satellite). Further, as a matter of course, customers don't maintain an Internet presence through which the business can communicate information and/or access a STB. In view of the above, it is desirable to provide a mechanism for a business to access a customer's home and/or devices in order to deliver/control various parameters for such a customer. To provide a better understanding of the prior art, a brief description of STB communications may be useful.

Unlike mobile devices such as iOS™ (using Apple™ Push Notification Service [APNS]) and Android™ (using Google™ Cloud Message [GCM]) devices, there has not been an effective way to deliver one-on-one notifications to STB devices. Traditionally, in order to send notifications to STBs, television providers, such as DirecTV™, rely on broadcast messages to deliver notifications to their television STBs. Broadcast messages are effective for group notifications, such as firmware upgrades, program guide updates, etc. However, it becomes very expensive if providers attempt to deliver more personalized service notifications, such as recommendations and personal messages.

More broadly, traditional communications between broadband connected set top box (STB) devices/clients and head-end (HE) application servers (i.e., where television broadcast signals are collected and transmitted from) have been relying on HTTP (hypertext transfer protocol) as the transport protocol, which requires the STB clients to initiate the connection. There are times when the HE application needs to start/initiate the communication with designated client STB devices. Such an initiation is usually achieved either by the client constantly polling HE applications, or running a local service on the managed client device for the HE server to call. However, if the STB resides behind a firewall, such a mechanism doesn't work without some protocol like STUN (Session Traversal Utilities for NAT [network address translation]) or port forwarding rules in place.

In view of the above, what is needed is the capability for a business (e.g., an HE) to initiate and maintain a connection with a STB to communicate various messaging/configuration parameters.

SUMMARY OF EMBODIMENTS OF THE INVENTION

Embodiments of the invention utilize a communication protocol for a head-end (HE) application to initiate and maintain a persistent connection with a device (e.g., an STB device) to provide personalized services. Based on the persistent connection, full knowledge of the connection status of individual STBs may be maintained enabling the distribution (e.g., push) of one-on-one messages, commands and notifications to individual broadband connected devices to collect configuration files, parental control settings, playlist synchronization across household devices, personal recommendations, etc. on demand.

BRIEF DESCRIPTION OF THE DRAWINGS

Referring now to the drawings in which like reference numbers represent corresponding parts throughout:

FIG. 5A is a diagram of a representative data stream in accordance with one or more embodiments of the invention;

FIG. 5B is a diagram showing one embodiment of a data packet for one transport protocol that can be used with the present invention;

FIG. 5C is a diagram showing another embodiment of a data packet for the MPEG-2 protocol in accordance with one or more embodiments of the invention;

FIG. 6 is a block diagram of a set top box (STB) (also hereinafter alternatively referred to as receiver or integrated receiver/decoder, or IRD) in accordance with one or more embodiments of the invention.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide a method and system for a head end to initiate and maintain a persistent connection with a set top box.

Distribution System

Figure 1:
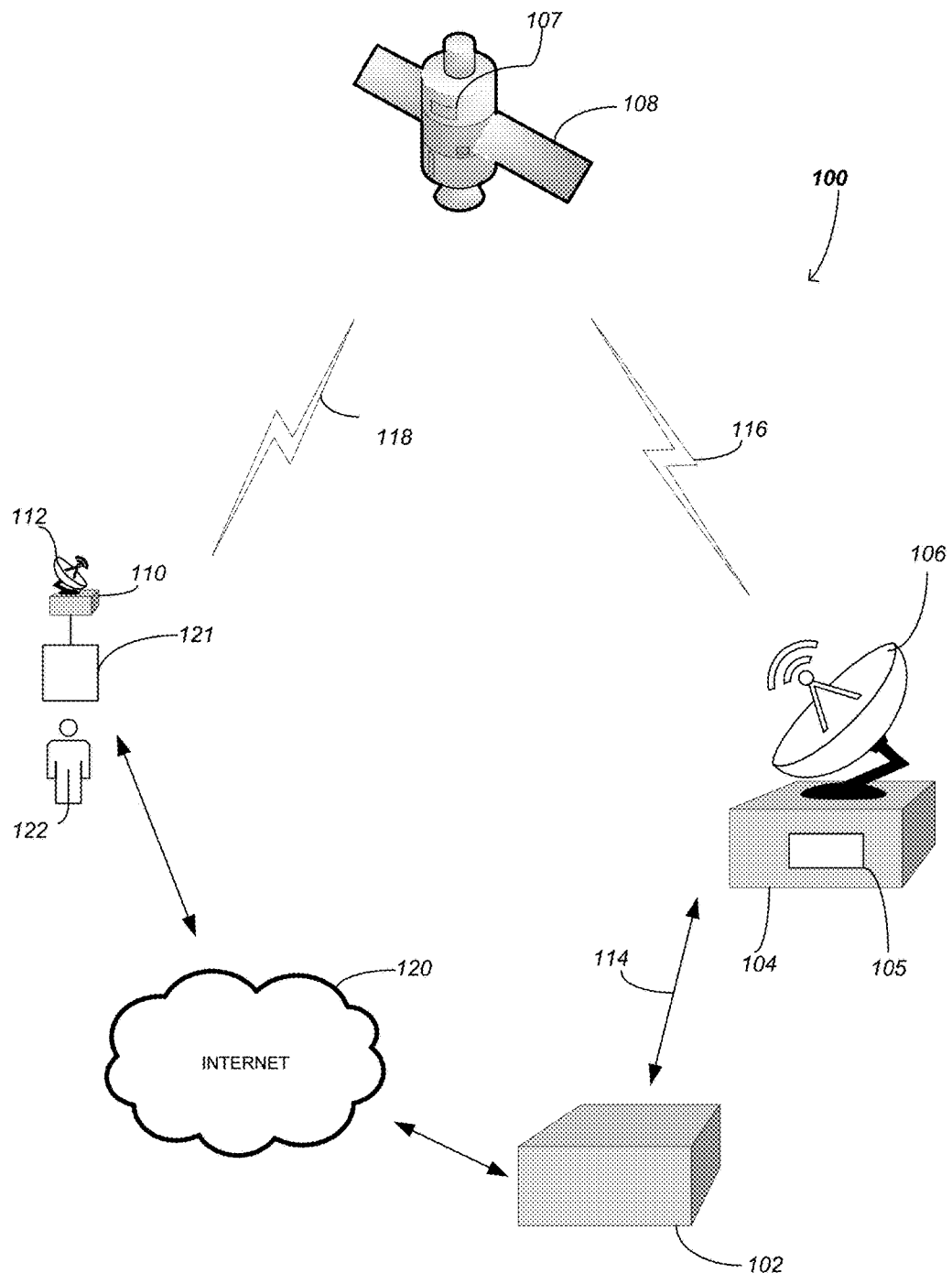
FIG. 1 is a diagram illustrating an overview of a distribution system that can be used to provide video data, software updates, and other data to subscribers in accordance with one or more embodiments of the invention.

FIG. 1 is a diagram illustrating an overview of a distribution system 100 that can be used to provide video data, software updates, and other data to subscribers. The distribution system 100 comprises a control center 102 in communication with an uplink center 104 (together hereafter alternatively referred to as a headend) via a ground or other link 114 and with a subscriber receiver station 110 via the Internet 120, a public switched telephone network (PSTN) or other link. The control center 102, or headend provides program material (e.g. video programs, audio programs, software updates, and other data) to the uplink center 104 and coordinates with the subscriber receiver stations 110 to offer, for example, pay-per-view (PPV) program services, including billing and associated decryption of video programs.

The uplink center receives program material and program control information from the control center 102, and using an uplink antenna 106 and transmitter 105, transmits the program material and program control information to the satellite 108. The satellite 108 receives and processes this information, and transmits the video programs and control information to the subscriber receiver station 110 via downlink 118 using one or more transponders 107 or transmitters. The subscriber receiving station 110 comprises a receiver communicatively coupled to an outdoor unit (ODU) 112 and a display 121. The receiver processes the information received from the satellite 108 and provides the processed information to the display 121 for viewing by the subscriber 122. The ODU 112 may include a subscriber antenna and a low noise block converter (LNB).

In one embodiment, the subscriber receiving station antenna is an 18-inch slightly oval-shaped antenna. Standard definition transmissions are typically in the Ku-band, while the high definition (HD) transmissions are typically in the Ka band. The slight oval shape is due to the 22.5 degree offset feed of the LNB which is used to receive signals reflected from the subscriber antenna. The offset feed positions the LNB out of the way so it does not block any surface area of the antenna minimizing attenuation of the incoming microwave signal.

The distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression and multiplexing techniques, two satellites 108 working together can receive and broadcast over 150 conventional (non-HDTV) audio and video channels via 32 transponders.

While embodiments of the invention disclosed herein will be described with reference to a satellite based distribution system 100, embodiments of the invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of embodiments of the present invention.

Although the foregoing has been described with respect to an embodiment in which the program material delivered to the subscriber 122 is video (and audio) program material such as a movie, the foregoing method can be used to deliver program material comprising purely audio information or other data as well. It is also used to deliver current receiver software and announcement schedules for the receiver to rendezvous to the appropriate downlink 118. Link 120 may be used to report the receiver's current software version.

Overall Architecture of Bi-Directional Messaging System

As described above, it is desirable to have a mechanism to initiate a connection between a set-top box in a subscriber receiving station 110 (e.g., in a home) with a head-end 104 that remains open/persistent (e.g., until a subscriber reboots the set top box, loses, power, downloads new software, etc.). Such a persistent connection may remain open for weeks or months at a time. By enabling such a persistent connection, a business (e.g., via the head-end 104) may perform various functions including troubleshooting (e.g., to retrieve diagnostic information about/within the set top box via the persistent connection), enabling/configuring parental controls, synchronizing viewing between multiple devices (e.g., mobile phones and homes), personalized messaging, etc.

Figure 2A:
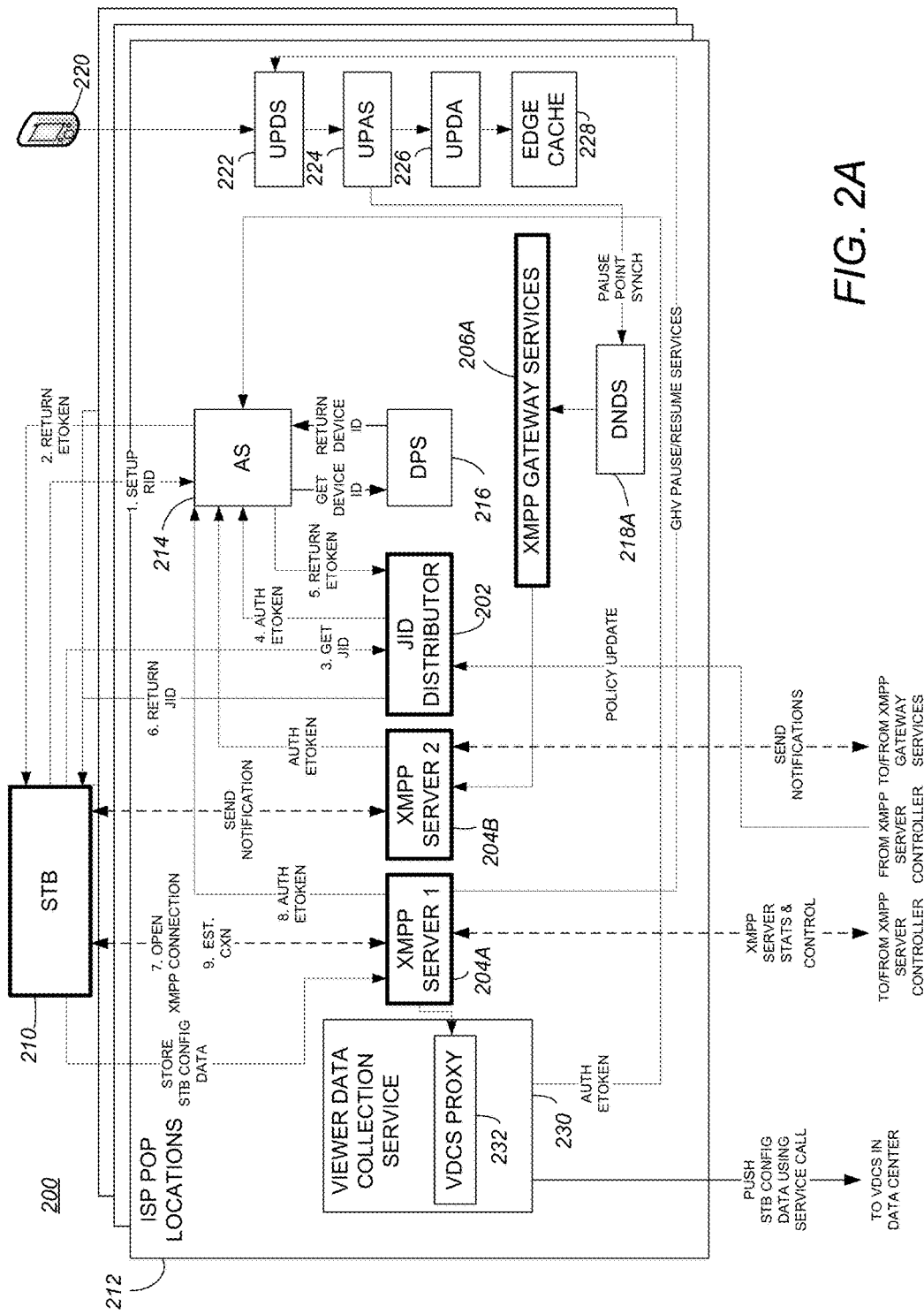
FIGS. 2A and 2B illustrate the overall architecture that utilizes a communication protocol (e.g., XMPP) to enable a bi-directional messaging system in accordance with one or more embodiments of the invention.
Figure 2B:
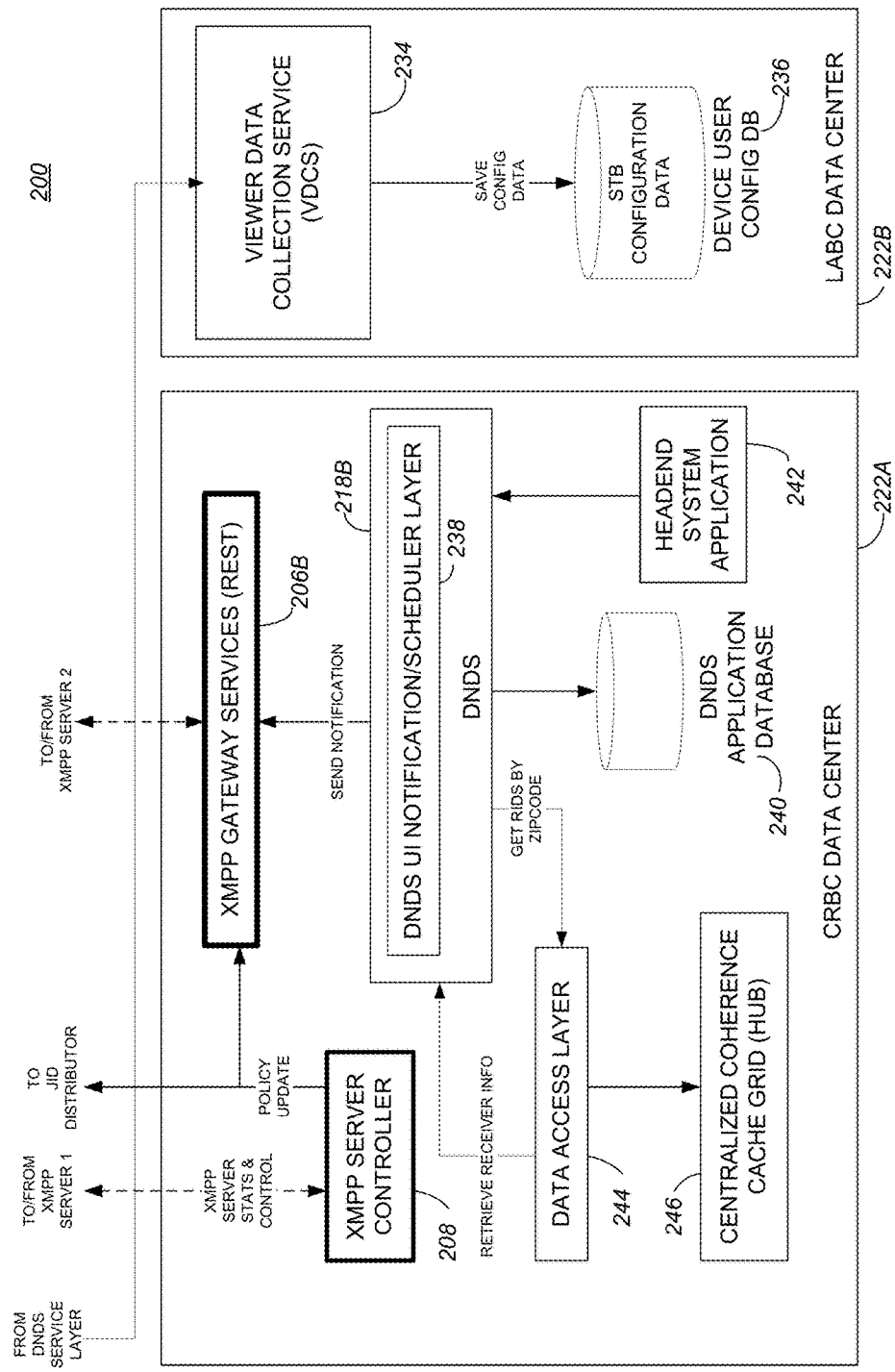

While multiple different communication protocols may be utilized to maintain a persistent connection, embodiments of the invention may utilize XMPP (Extensible Messaging and Presence Protocol). To utilize such a communication protocol, various components may be required. FIGS. 2A and 2B illustrate the overall architecture that utilizes a communication protocol (e.g., XMPP) to enable a bi-directional messaging system in accordance with one or more embodiments of the invention. In particular, FIG. 2A illustrates the points of presence (POPs) 212 at the various locations (e.g., Los Angeles, Castle Rock, and Sterling locations) while FIG. 2B illustrates various data centers 222 (e.g., containing components with limited/more secure access) at the various locations.

The XMPP system 200 includes four core head-end 104 components and one core client/STB 110 component (the core components are in bold in FIGS. 2A and 2B). The core components are the JID (Jabber Identifier) distributor 202, the XMPP servers 204 (e.g., XMPP server 1 204A, XMPP server 2 204B, as well as additional XMP servers [not illustrated]. collectively referred to as XMPP servers 204), XMPP Gateway Services 206 (e.g., XMPP gateway services 206A within POPs 212 and dedicated XMPP gateways services 206B within data centers 222), XMPP server controller 208, and the XMPP enabled STB 210. Referring to FIG. 2A, the JID Distributor 202, and the XMPP Servers 204 are located within the internet service provider (ISP) POPs (point of presence) locations 212 (e.g., Los Angeles, Castle Rock, and Sterling ISP POPs). Similarly, the XMPP Server Controller 208 is located in the data centers 222. XMPP Gateway Services 206A are located in the POPs 212 and are used to perform services that may be initialized/utilized by STBs 210 (e.g., to return to the pause point for content played on another device). XMPP Gateway Services 206B are located in data centers 222 and are dedicated for services utilized by head end 104 such as messages sent to a large subset of STBs 210.

Such XMPP Gateway Services 206A and 206B work with device notification data services (DNDS) 218A and 218B respectively. In particular, the DNDS 218A may reside in the POP 212 while the DNDS 218B may reside in a datacenter 222. Further, end users may only access services in the POP 212 that provides a secure area where outside services may be stored/available. End users may not have the capability to directly access services in the datacenters 222, but some services within datacenters 222 may be accessed by applications within the POPs 212.

XMPP Gateway Services 206A may receive data/information/notifications from DNDS 218A such as pause point synchronization information from other devices that may be viewing content. For example, devices 220 such as cellular phones, tablet computers, etc. may be viewing content (e.g., via a cellular network connection, Ethernet connection, or other network based connection to the Internet). Such devices communicate with and retrieve content from ISP POP Locations 212 via various universal processes. The universal process data services (UPDS) 222 provides content and serves as an OSB (Oracle™ service bus) proxy for the UPAS 224, the universal process application service (UPAS) 224 provides applications/services that may be utilized by device 220 (e.g., it serves as a service layer for profiles and pause points), the universal process data access (UPDA) 226 stores data for a variety of services/objects, and the edge cache 228 provides access to information/content that is in cache and is available within/from cache memory (e.g., at a higher access/data rate). As an example, the UPAS 224 may provide pause point synchronization information regarding where the user has paused when viewing content on device 220. Such pause point synchronization information may be provided to DNDS 218A, which in turn provides the information to XMPP Gateway Services 206A to be passed to the STB 210 (e.g., via XMPP servers 204). In addition, the XMPP server 204 may provide GHV (global viewing history) pause/resume services by requesting information (e.g., the pause/resume point) and or communication with the universal process data service 222. In this regard, the GHV pause/resume services enable the ability for a user to log into an STB 210 (or mobile device 220) and view their personalized viewing history, as well as any viewing in progress (e.g., pause points).

The XMPP JID Distributor 202 allows authenticated STB clients 210 to retrieve assigned Jabber ID and XMPP server 204 host addresses. The XMPP servers 204 provide XMPP messaging, presence, and XML (Extensible Markup Language) routing features. The XMPP gateway services 206 provide an interface to encapsulate XMPP specifics from other head-end 104 components and provide a gateway for the head-end servers to communicate to STB clients 210 through XMPP servers 204. The XMPP server controller 208 provides administrative graphical user interfaces for operators to monitor and control XMPP component health checks, configuration changes, and collect statistics. The XMPP enabled STB 210 is provisioned as the service endpoint of the XMPP JID Distributor 202. Each of the components 202-210 will be described with respect to the functionality and features performed below.

Connection Process

After the STB 210 boots, the STB requires an authentication token from the authentication server (AS) 214 web service. Accordingly, at a first step (i.e., step 1), the STB 210 sends a setup RID (resource identifier) request/command (i.e., Setup RID (CardID, RID)) to the authentication server (AS) 214. The request to setup the RID includes an identifier for the STB 210 card (i.e., the conditional access module identifier—see further description below) as well as a resource identifier (RID). The AS 214 provides a service for authenticating the user and determining if the user is authorized to receive the service requested. For example, the AS 214 may determine whether the user/user account associated with the STB 210 is a current subscriber that is up to date on bill payment. The AS 214 communicates with the device profile system (DPS) 216 to acquire a device ID from the DPS 216. The AS 214 then generates an EToken that includes the device ID) and returns the EToken to the STB 210 (i.e., step 2. return EToken).

Once The STB 210 has retrieved the token, the STB 210 contacts the JID Distributor 202 service to retrieve an assigned Jabber ID, resource ID, and the host and port information (which is derived based on user account number and zip code information). Accordingly, at step 3, the STB 210 sends a getJID request (that includes the EToken, RID, and site ID) to the JID Distributor 202.

The JID Distributor 202 has the responsibility for equally distributing the load across the servers 204 and across the POPs 212 and accounts for any health and availability issues. Once the request for the JID is received from the STB 210, the JID Distributor 202 checks with the AS 214 to authenticate the STB 210. Accordingly, the JID Distributor 202 presents the EToken to the AS 214 (at step 4) requesting authentication and the AS 214 returns the EToken along with the device ID, account ID, and zip code information for the zip code associated with the account holder (i.e., at step 5). The JID Distributor 202 determines which XMPP server 204 the STB 210 device should connect to. The JID Distributor 202 then returns the JID to the STB 210 (i.e., at step 6).

The STB 210 then starts the connection with the assigned XMP server 204, providing the assigned Jabber ID, authentication token, and resource ID (e.g., at step 7, the STB 210 opens an XMPP connection (SASL—simple authentication and security layer) with the JID and EToken). The XMPP server 204 authenticates the token (provided by the STB) with the AS 214 (i.e., step 8 by sending an authentication request with the EToken, site ID, and RID). Once the AS 214 authenticates the EToken, the STB 210 may establish the persistent connection with the XMPP server 204 (i.e., step 9). In other words, once the server 204 authenticates the STB client 210 (i.e., with the AS 214), the XMPP stream can be started, and the STB 210 remains connected to the XMPP server 204. Similar actions may be performed with multiple XMPP Servers 204A/204B.

Within ISP POPs 212, viewer data collection services (VDCS) 230 (e.g., via VDCS proxy 232), may be used to collect data about the STB 210. For example, suppose an STB 210 is experiencing a problem; information such as configuration data may be utilized by the head end to determine and/or solve the problem. VDCS 230 may retrieve such configuration information from the STB 210 via the XMPP server 204. Similar to the XMPP servers, the VDCS 230 authenticates the STB 210 with the AS 214 using an EToken. Once authenticated, the VDCS 230 provides/pushes such STB configuration data using a service call/API to VDCS 234 in a data center 222. The STB configuration is stored (by the VDCS 234) in a device user configuration database 236. The head end 104 can then process/analyze the configuration data as needed.

Command Distribution and Processing

FIG. 2B illustrates the interaction with exemplary data centers 222 at the various locations (e.g., the Castle Rock Broadcast Center Data Center 222A and the Los Angeles Broadcast Center Data Center 222B—collectively referred to as broadcast centers 222). Access may be limited to such components within such data centers 222 to various application programming interfaces (APIs). The APIs include the ability to send notifications (i.e., sending a message to a particular device [e.g., based on a device ID]), disconnecting a device [e.g., based on a device ID], retrieving STB configuration data [e.g., via a get command that identifies the device ID via the VDCS 230], removing an STB configuration [e.g., based on a device ID], and storing STB configuration data [e.g., based on a resource ID and configuration data in the device user configuration database 236]).

The Device Notification and Data Service (DNDS) 218B is the head-end system (i.e., the DNDS 218B that is dedicated to head-end based actions) that initiates commands to be sent to connected STBs 210 (e.g., messages sent to a large subset of STBs 210). The DNDS 218 (DNDS 218A and DNDS 218B) is also responsible for converting notification requests to XMPP XML, messages, and/or for providing a user interface to send commands to devices (e.g., using a DNDS User Interface (UI) Notification/Scheduler Layer 238). The notification requests, data, etc. may be stored in the DNDS Application database 240 (e.g., on an AMP Enterprise RAC [e.g., an Oracle™ middleware cluster]) and/or may be received from various headend system applications 242. In this regard, commands/notifications/etc. originating at the head end (e.g., via the head end system or applications 242 at/in the headend 104) are provided to the DNDS 218 for further processing/conversion to send to the XMPP servers 204 which communicate with the STBs 210.

To enable the processing between DNDS 218B and STB 210, DNDS 218B, may communicate with the data access layer 244. For example, DNDS 218B may request information (from data access layer 244) about the receivers that the DNDS 218B desires to communicate with (e.g., by requesting resource IDs by zip code [e.g., via a getRID request] from the data access layer 244). Such information may be stored/organized in a centralized coherence cache grid (HUB) 246. The data access layer 244 retrieves the information from the HUB 246 and returns the requested info to the DNDS 218B (which in turn can send the commands/notifications/etc. to the STB 210 via XMPP gateway services 206B).

When the XMPP gateway service 206B receives calls from DNDS 218B to distribute commands, the gateway service 206B uses the same logic (described above) to find out the Jabber ID and XMPP server 204 based on the provided account number and zip code information from the DNDS 218B. The gateway service 206B then delivers the payload to the designated devices 210 through the XMPP server controller 208.

As described above, the XMPP server controller 208 provides administrative GUI interfaces for operators to monitor and control XMPP component (e.g., XMPP Servers 204 and or POPs 212) health checks, configuration changes, and collect statistics (e.g., from XMPP servers 204). For example, if the LA POP 212 or XMPP server 204 (that the STB 210 is connected to) becomes unhealthy or fails, the XMPP server controller 208 updates the JID Distributor 202 (as well as the XMPP Gateway Services 206) with a new/updated policy indicating that the POP 212 or XMPP server 204 is offline. Similarly, if the XMPP server 204 that the STB 210 is connected to is overloaded, the STB 210 may be disconnected and the STB 210 would initiate the process again (i.e., at step 1 above) to determine which XMPP server 204 to connect to and would receive a different answer based on the XMPP server controller 208 management/policy. Further, if an entire POP 212 were to go offline, the STB 210 may discover such an issue via a regularly timed ping connection test (e.g., where the STB 210 pings the connection every five [5] minutes), and would restart the connection process as described above.

In view of the above, embodiments of the invention initiate and maintain a persistent connection between a STB 210 and a headend 104. In particular, embodiments of the invention utilize a communication protocol to facilitate an IP network based bi-directional messaging between STBs 210 and head-end systems 104. Such a persistent connection may be utilized to provide a variety of different services/functions. Some exemplary use cases for such services (described below) may require headend components to send commands to broadband connected STBs 210 (see below for additional descriptions of STB configuration synchronization, parental control, and playlist synchronization). An exemplary embodiment may also utilize the XMPP protocol—a protocol that was designed to enable client-to-client (C2C), client-to-server (C2S), server-to-client (S2C), and server-to-server (S2S) communications, for use primarily in instant messaging, gaming and video chats.

STB Configuration Synchronization

With STB 210 configuration synchronization, a head end system 104 can command a STB 210 to send back its configuration on a periodic or on-demand basis. The backup configuration can later be restored or installed on a STB 210 via XMPP.

STB Parental Control Synchronization

This function enables a client application to request parental control settings of STB receivers. Having STB parental control settings be retrievable on-demand allows for parity of enforcing parental control on non-STB devices.

STB Playlist Synchronization

This function allows a satellite television subscriber to display on a client device, an aggregated view of playlists that are maintained on STB receivers of the user's account.

Pause Point Synchronization

This function enables the ability to synchronizing viewing between an STB 210 and other devices 220. When a user watches media content (e.g., a television episodic or movie) on a device 220, and pauses viewing, such a pause point is relayed/transmitted to the STB 210, thereby allowing the user to pickup viewing at the same pause point on a display device connected to the STB 210.

Personalized Title Recommendations

This function enables titles to be recommended to and delivered to individual users/STBs 210 based on prior viewing habits and/or similar viewing of other users.

Uplink Configuration

Figure 3:
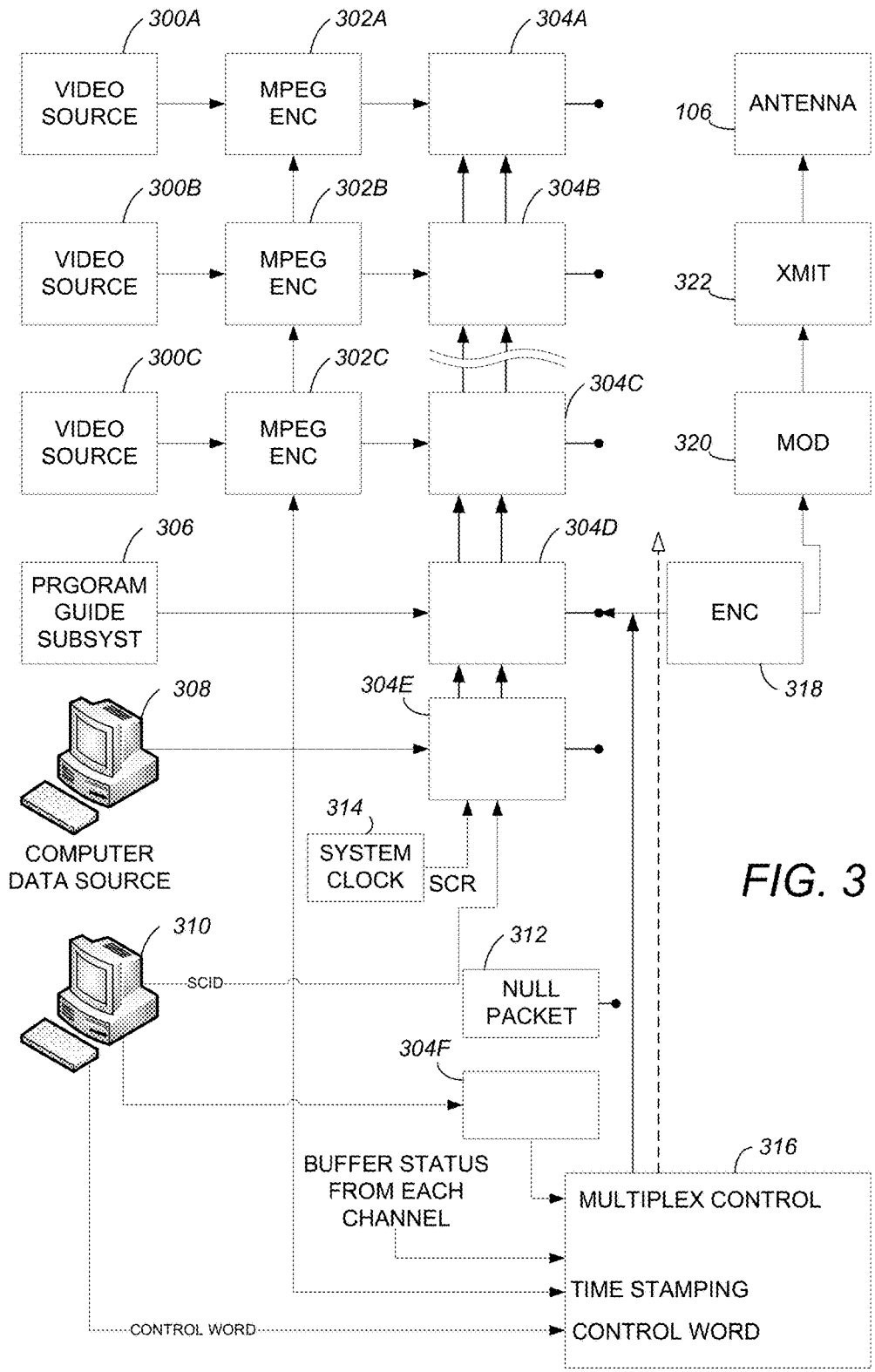
FIG. 3 is a block diagram showing a typical uplink configuration for a single satellite transponder, showing how video program material is uplinked to the satellite by the control center and the uplink center in accordance with one or more embodiments of the invention.

FIG. 3 is a block diagram showing a typical uplink configuration for a single satellite 108 transponder, showing how video program material is uplinked to the satellite 108 by the control center 102 and the uplink center 104. FIG. 3 shows three video channels (which could be augmented respectively with one or more audio channels for high fidelity music, soundtrack information, or a secondary audio program for transmitting foreign languages), a data channel from a program guide subsystem 306 and computer data information from a computer data source 308.

The video channels are provided by a program source of video material 300A-300C (collectively referred to hereinafter as video source(s) 300). The data from each video program source 300 is provided to an encoder 302A-302C (collectively referred to hereinafter as encoder(s) 302). Each of the encoders accepts a program time stamp (PTS) from the controller 316. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 302 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 302, the signals are converted into data packets by a packetizer 304A-304F (collectively referred to hereinafter as packetizer(s) 304) associated with each source 300.

The data packets are assembled using a reference from the system clock 314 (SCR), and from the conditional access manager 310, which provides the SCID to the packetizers 304 for use in generating the data packets. These data packets are then multiplexed into serial data and transmitted.

Program Guide Subsystem

Figure 4:
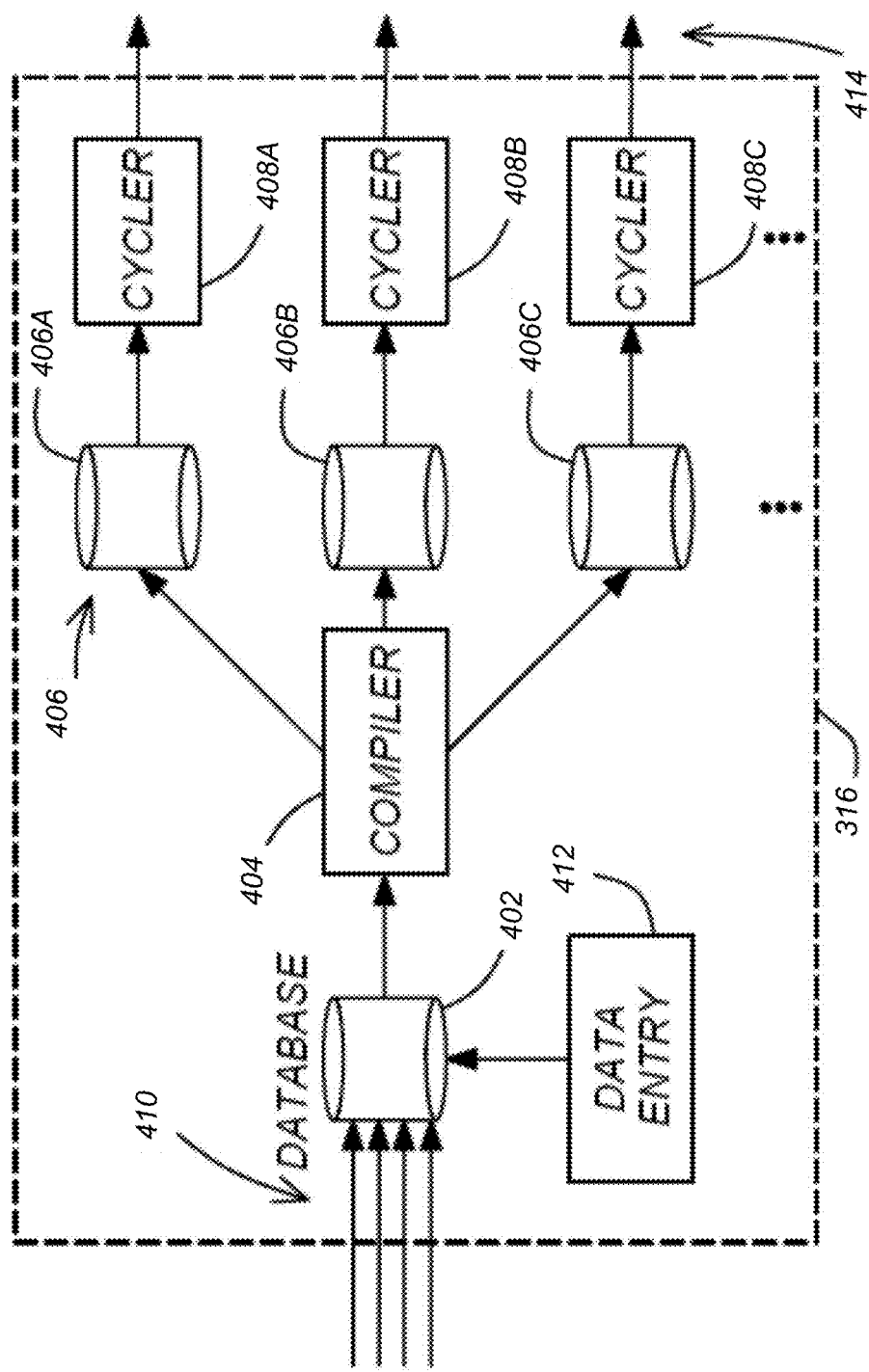
FIG. 4 is a block diagram of one embodiment of the program guide services/subsystem in accordance with one or more embodiments of the invention.

FIG. 4 is a block diagram of one embodiment of the program guide services/subsystem 316. The program guide data transmitting system 316 includes program guide database 402, compiler 404, sub-databases 406A-406C (collectively referred to as sub-databases 406) and cyclers 408A-408C (collectively referred to as cyclers 408).

Schedule feeds 410 provide electronic schedule information about the timing and content of various television channels, such as that found in television schedules contained in newspapers and television guides. Schedule feeds 410 preferably include information from one or more companies that specialize in providing schedule information, such as GNS, TRIBUNE MEDIA SERVICES, and T.V. DATA. The data provided by companies such as GNS, TRIBUNE MEDIA SERVICES and T.V. DATA are typically transmitted over telephone lines or the Internet to program guide database 402. These companies provide television schedule data for all of the television stations across the nation plus the nationwide channels, such as SHOWTIME, HBO, and the DISNEY CHANNEL. The specific format of the data that are provided by these companies varies from company to company. Program guide database 402 preferably includes schedule data for television channels across the entire nation including all nationwide channels and local channels, regardless of whether the channels are transmitted by the transmission station.

Program guide database 402 is a computer-based system that receives data from schedule feeds 410 and organizes the data into a standard format. Compiler 404 reads the standard form data out of program guide database 402, identifies common schedule portions, converts the program guide data into the proper format for transmission to users (specifically, the program guide data are converted into objects as discussed below) and outputs the program guide data to one or more of sub-databases 408.

Program guide data are also manually entered into program guide database 402 through data entry station 412. Data entry station 412 allows an operator to enter additional scheduling information, as well as combining and organizing data supplied by the scheduling companies. As with the computer organized data, the manually entered data are converted by the compiler into separate objects and sent to one or more of sub-databases 406.

The program guide objects are temporarily stored in sub-databases 406 until cyclers 408 request the information. Each of cyclers 408 preferably transmits objects at a different rate than the other cyclers 408. For example, cycler 408A may transmit objects every second, while cyclers 408B and 408C may transmit objects every 5 seconds and every 10 seconds, respectively.

Since the subscriber's receivers may not always be on and receiving and saving objects, the program guide information is continuously re-transmitted. Program guide objects for programs that will be shown in the next couple of hours are sent more frequently than program guide objects for programs that will be shown later. Thus, the program guide objects for the most current programs are sent to a cycler 408 with a high rate of transmission, while program guide objects for later programs are sent to cyclers 408 with a lower rate of transmission. One or more of the data outputs 414 of cyclers 408 are forwarded to the packetizer of a particular transponder.

It is noted that the uplink configuration depicted in the prior figures and the program guide subsystem depicted in FIG. 4 can be implemented by one or more hardware modules, one or more software modules defining instructions performed by a processor, or a combination of both.

Broadcast Data Stream Format and Protocol

FIG. 5A is a diagram of a representative data stream. The first packet segment 502 comprises information from video channel 1 (data coming from, for example, the video sources 300A). The next packet segment 504 comprises computer data information that was obtained, for example from a computer data source. The next packet segment 506 comprises information from video channel 5 (from one of the video program sources 300A). The next packet segment 508 comprises program guide information such as the information provided by the program guide subsystem 306. As shown in FIG. 5A, null packets 510 created by a null packet module may be inserted into the data stream as desired.

The data stream therefore comprises a series of packets from any one of the data sources in an order determined by a controller. The data stream is encrypted by an encryption module 318, modulated by the modulator 320 (typically using a QPSK modulation scheme), and provided to a transmitter 322, that broadcasts the modulated data stream on a frequency bandwidth to the satellite via the antenna 106. The receiver/STB 210 receives these signals, and using the SCID, reassembles the packets to regenerate the program material for each of the channels.

FIG. 5B is a diagram showing one embodiment of a data packet for one transport protocol that can be used with embodiments of the present invention. Each data packet (e.g. 502-516) is 147 bytes long, and comprises a number of packet segments. The first packet segment 520 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 522 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 524 comprises 127 bytes of payload data, which is a portion of the video program provided by the video sources 200 or other audio or data sources. The final packet segment 526 is data required to perform forward error correction.

Embodiments of the present invention may also be implemented using MPEG transport protocols. FIG. 5C is a diagram showing another embodiment of a data packet for the MPEG-2 protocol. Each data packet comprises a sync byte 550, three transport flags 552, and a packet identifier (PID) 554. The sync byte 550 is used for packet synchronization. The transport flags include a transport error indicator flat (set if errors cannot be corrected in the data stream), a payload unit start indicator (indicting the start of PES data or PSI data, and a transport priority flag). The PID 554 is analogous to the SCID discussed above in that it identifies a data channel. A demultiplexer in the transport chip discussed below extracts elementary streams from the transport stream in part by looking for packets identified by the same PID. The scramble control flag 556 indicates how the payload is scrambled, the adaptation field flag 558 indicates the presence of an adaptation field 562, and the payload flag 560 indicates that the packet includes payload 564. The final packet segment 566 is data required to perform forward error correction.

Set Top Box

FIG. 6 is a block diagram of a set top box (STB) 210 (also hereinafter alternatively referred to as receiver or integrated receiver/decoder, or IRD). The set top box 210 is part of the receiver station and may comprise a tuner/demodulator 604 communicatively coupled to an ODU 112 having one or more LNBs 602. The LNB 602 converts the 12.2 to 12.7 GHz downlink signal 118 from the satellites 108 to, e.g., a 950-1450 MHz signal required by the set top box's 210 tuner/demodulator 604. The LNB 602 may provide either a dual or a single output. The single-output LNB 602 has only one RF connector, while the dual output LNB 602 has two RF output connectors and can be used to feed a second tuner 604, a second set top box 210 or some other form of distribution system.

The tuner/demodulator 604 isolates a single, digitally modulated transponder, and converts the modulated data to a digital data stream. As packets are received, the tuner/demodulator 604 identifies the type of each packet. If tuner/demodulator 604 identifies a packet as program guide data, tuner/demodulator 604 outputs the packet to memory. The digital data stream is then supplied to a forward error correction (FEC) decoder 606. This allows the set top box 210 to reassemble the data transmitted by the uplink center 104 (which applied the forward error correction to the desired signal before transmission to the subscriber receiving station 210) verifying that the correct data signal was received and correcting errors, if any. The error-corrected data may be fed from the FEC decoder module 606 to the transport module 608 via an 8-bit parallel interface.

The transport module 608 performs many of the data processing functions performed by the set top box 210 (e.g., using system random access memory 628). The transport module 608 processes data received from the FEC decoder module 606 and provides the processed data to the video MPEG decoder 614, the audio MPEG decoder 616, and the microcontroller 610 and/or data storage processor 630 for further data manipulation. In one embodiment of the present invention, the transport module 608, video MPEG decoder 614 and audio MPEG decoder 616 are all implemented on integrated circuits. This design promotes both space and power efficiency, and increases the security of the functions performed within the transport module 608. The transport module 608 also provides a passage for communications between the microprocessor 610 and the video and audio MPEG decoders 614, 616. As set forth more fully hereinafter, the transport module 608 also works with the conditional access module (CAM) 612 to determine whether the subscriber receiving station 210 is permitted to access certain program material. Data from the transport module 608 can also be supplied to external communication module 626.

The CAM 612 functions in association with other elements to decode an encrypted signal from the transport module 608. The CAM 612 may also be used for tracking and billing these services. In one embodiment of the present invention, the CAM 612 is a smart card, having contacts cooperatively interacting with contacts in the set top box 600 to pass information. In order to implement the processing performed in the CAM 612, the set top box 210, and specifically the transport module 608 provides a clock signal to the CAM 612.

Video data is processed by the MPEG video decoder 614. Using the video random access memory (RAM) 636, the MPEG video decoder 614 decodes the compressed video data and sends it to an encoder or video processor 615, which converts the digital video information received from the video MPEG module 614 into an output signal usable by a display or other output device. By way of example, processor 615 may comprise a National TV Standards Committee (NTSC) or Advanced Television Systems Committee (ATSC) encoder. In one embodiment of the invention both S-Video, baseband video and RF modulated video (NTSC or ATSC) signals are provided. Other outputs may also be utilized, and are advantageous if high definition programming is processed. Such outputs may include, for example, component video and the high definition multimedia interface (HDMI).

Using the audio RAM 620, audio data is likewise decoded by the MPEG audio decoder 616. The decoded audio data may then be sent to a digital to analog (D/A) converter 618. In one embodiment of the present invention, the D/A converter 618 is a dual D/A converter, one for the right and left channels. If desired, additional channels can be added for use in surround sound processing or secondary audio programs (SAPs). In one embodiment of the invention, the dual D/A converter 618 itself separates the left and right channel information, as well as any additional channel information. Other audio formats such as DOLBY DIGITAL AC-3 may similarly be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microprocessor 610 receives and processes command signals from the remote control 624, a set top box 210 keyboard interface, modem 640, and transport 608. The microcontroller 610 receives commands for performing its operations from a processor programming memory, which permanently stores such instructions for performing such commands. The memory used to store data for microprocessor 610 and/or transport 608 operations may comprise a read only memory (ROM) 638, an electrically erasable programmable read only memory (EEPROM) 622, a flash memory 652 and/or a random access memory 650, and/or similar memory devices. The microprocessor 610 also controls the other digital devices of the set top box 210 via address and data lines (denoted "A" and "D" respectively, in FIG. 6).

The modem 640 connects to the customer's phone line via the PSTN port. Alternatively, the modem 640 may comprise an Ethernet connection or wireless adapter to connect to the customer's network and related Internet connection. The set top box 210 communicates with (e.g., via the modem 640)

the head end 104, e.g. the program provider, and transmits the customer's purchase information for billing purposes, and/or other information. The modem 640 is controlled by the microprocessor 610. The modem 640 can output data to other I/O port types including standard parallel and serial computer I/O ports. Data can also be obtained from a cable or digital subscriber line (DSL) modem, or any other suitable source. Further, the modem 640 may be utilized to maintain the persistent connection with the head end 104 as described above.

The set top box 210 may also comprise a local storage unit such as the storage device 632 for storing video and/or audio and/or other data obtained from the transport module 608. Video storage device 632 can be a hard disk drive, a read/writeable compact disc of DVD, a solid state RAM, or any other storage medium. In one embodiment of the present invention, the video storage device 632 is a hard disk drive with specialized parallel read/write capability so that data may be read from the video storage device 632 and written to the device 632 at the same time. To accomplish this feat, additional buffer memory accessible by the video storage 632 or its controller may be used. Optionally, a video storage processor 630 can be used to manage the storage and retrieval of the video, audio, and/or other data from the storage device 632. The video storage processor 630 may also comprise memory for buffering data passing into and out of the video storage device 632. Alternatively or in combination with the foregoing, a plurality of video storage devices 632 can be used. Also alternatively or in combination with the foregoing, the microprocessor 610 can also perform the operations required to store and or retrieve video and other data in the video storage device 632.

The video processing module 615 output can be directly supplied as a video output to a viewing device such as a video or computer monitor. In addition the video and/or audio outputs can be supplied to an RF modulator 634 to produce an RF output and/or 8 vestigial side band (VSB) suitable as an input signal to a conventional television tuner. This allows the set top box 600 to operate with televisions without a video input.

Each of the satellites 108 comprises one or more transponders, each of which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective SCIDs.

Preferably, the set top box 210 also receives and stores a program guide in a memory available to the microprocessor 610. Typically, the program guide is received in one or more data packets in the data stream from the satellite 108. The program guide can be accessed and searched by the execution of suitable operation steps implemented by the microcontroller 610 and stored in the processor ROM 638. The program guide may include data to map viewer channel numbers to satellite networks, satellite transponders and SCIDs, and also provide TV program listing information to the subscriber 122 identifying program events.

Initially, as data enters the set top box 210, the tuner/demodulator 604 looks for a boot object. Boot objects are always transmitted with the same SCID number, so tuner 604 knows that it must look for packets marked with that identification number. A boot object identifies the identification numbers where all other objects can be found. Further, such boot objects may initiate the persistent connection methods described above.

As data is received and stored in the memory, the microprocessor 610 acts as a control device and performs various operations on the data in preparation for processing the received data. These operations include packet assembly, object assembly and object processing.

The first operation performed on data objects stored in the memory 650 is packet assembly. During the packet assembly operation, microprocessor 610 examines the stored data and determines the locations of the packet boundaries.

The next step performed by microprocessor 610 is object assembly. During the object assembly step, microprocessor 610 combines packets to create object frames, and then combines the object frames to create objects. Microprocessor 610 examines the checksum transmitted within each object frame, and verifies whether the frame data was accurately received. If the object frame was not accurately received, it is discarded from memory 650. Also during the object assembly step, the microprocessor 610 discards assembled objects that are of an object type that the microprocessor 610 does not recognize. The set top box 210 maintains a list of known object types in memory 650. The microprocessor 610 examines the object header of each received object to determine the object type, and the microprocessor 610 compares the object type of each received object to the list of known object types stored in memory 650. If the object type of an object is not found in the list of known object types, the object is discarded from memory 650. Similarly, the set top box 210 maintains a list of known descriptor types in memory 650, and discards any received descriptors that are of a type not in the list of known descriptor types.

The last step performed by microprocessor 610 on received object data is object processing. During object processing, the objects stored in the memory 650 are combined to create a digital image. Instructions within the objects direct microprocessor 610 to incorporate other objects or create accessible user-links. Some or all of the digital images can be later converted to an analog signal that is sent by the set top box 210 to a television or other display device for display to a user.

The functionality implemented in the set top box 600 depicted in FIG. 6 can be implemented by one or more hardware modules, one or more software modules defining instructions performed by a processor, or a combination of both.

Logical Flow

Figure 7:
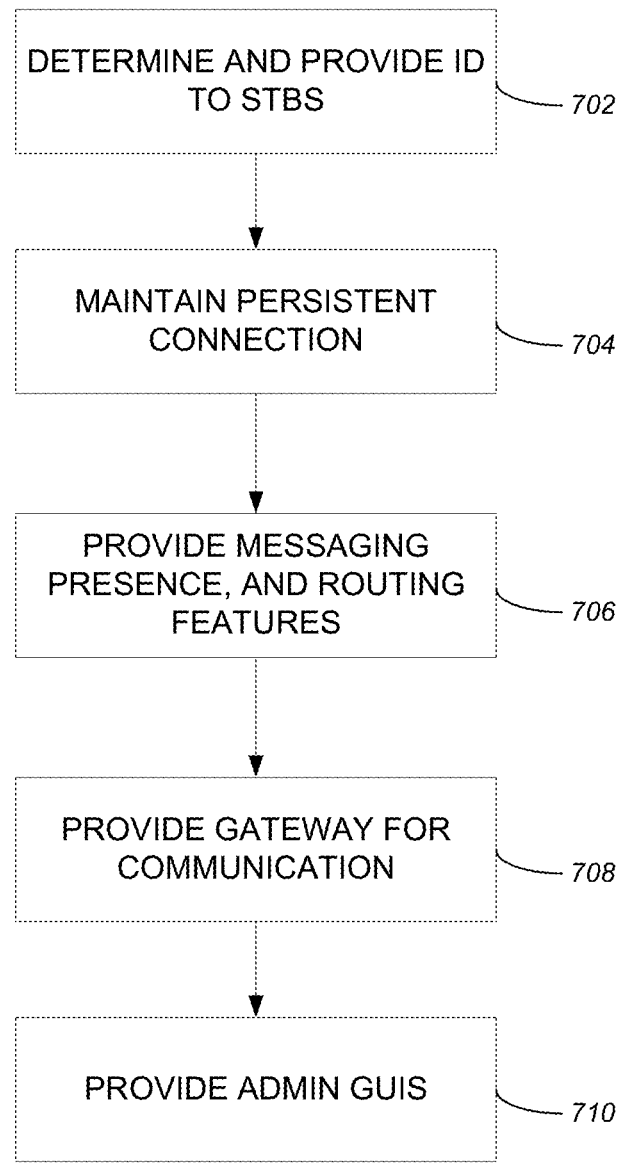
FIG. 7 illustrates the logical flow for messaging between a headend system and a set top box in accordance with one or more embodiments of the invention.

FIG. 7 illustrates the logical flow for messaging between a headend system and a set top box in accordance with one or more embodiments of the invention.

At step 702, a distributor (e.g., a JID distributor) determines and provides an assigned communication identifier (e.g., a JID or Jabber ID that is uniquely assigned to each of the set top box clients) and an assigned server host address (that corresponds to one or more first [e.g., XMPP] servers) to each of one or more set top box clients. As part of the determination, the distributor may also authenticate the STB clients with an authentication server (e.g., prior to providing the assigned communication ID). The assigned communication ID and server host address that are assigned maybe based on a user account number and zip code information corresponding to the location of the user/STB client.

At step 704, a persistent connection is maintained between the first servers and the STB (e.g., XMPP enabled STB) clients.

At step 706, the first servers are configured to provide messaging (e.g., XMPP messaging), presence, and routing features via the persistent connection. As part of maintaining the persistent connection, the first servers may also authenticate the STB clients prior to initializing/providing/maintaining the persistent connection.

At step 708, a gateway service (e.g., an XMPP gateway service) provides a gateway for headend servers to communicate with the STB clients through the first servers. Such a gateway may be used by a DNDS to initiate command to send to a group of the STB clients through the first servers.

At step 710, a server controller (e.g., an XMPP server controller) provides administrative graphical user interfaces for operators to monitor and control health checks, configuration changes, and collect statistics for the distributor, first servers, and the gateway service. The server controller may also (as part of the admin GUIs) provide a policy update to the distributor and the gateway based on a status of the headend system and/or the first servers (e.g., health status).

In the logical flow, the distributor and first services may be maintained at an ISP POP location of a satellite broadcast television system. In addition, the gateway service and server controller may be maintained at a data center of the satellite broadcast television system.

CONCLUSION

This concludes the description of the preferred embodiment of the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for messaging, between a headend system and a set top box, comprising:
    (a) a distributor determining and providing an assigned communication identifier and an assigned server host address, that corresponds to one of one or more first servers, to each of one or more set top box clients;
    (b) the one or more first servers:
        (1) maintaining a persistent connection with one or more set top box clients; and
        (2) providing messaging, presence, and routing features via the persistent connection;
    (c) a gateway service providing a gateway for one or more headend servers to communicate with the one or more set top box clients through the one or more first servers; and
    (d) a server controller providing administrative graphical user interfaces for operators to maintain the persistent connection, to monitor and control health checks, configuration changes, and collect statistics for the distributor, one or more first servers, and the gateway service; and
    wherein the gateway service and server controller are maintained at a data center.

2. The system of claim 1, wherein:
    the distributor comprises a Jabber identification (JID) distributor; and
    the assigned communication identifier is a JID identifier uniquely assigned to each of the one or more set top box clients.

3. The system of claim 1, wherein:
    the one or more first servers comprise Extensible Messaging and Presence Protocol (XMPP) servers;
    the messaging comprises XMPP messaging;
    the gateway service comprises an XMPP gateway service;
    the server controller comprises an XMPP server controller; and
    the one or more set top box clients comprise XMPP enabled set top box clients.

4. The system of claim 1, wherein the distributor determines and provides the assigned communication identifier and server host address to each of the one or more set top box clients that have been authenticated by an authentication server.

5. The system of claim 1, wherein the distributor determines and provides the assigned communication identifier and server host address to each of one or more set top box clients based on a user account number and zip code information.

6. The system of claim 1, wherein the one or more first servers authenticate the one or more set top box clients prior to maintaining the persistent connection and providing the messaging, presence, and routing features.

7. The system of claim 1, further comprising device notification and data service (DNDS) initiating commands to be sent a group of the one or more set top box clients through the one or more first servers.

8. The system of claim 1, wherein the server controller provides a policy update to the distributor and the gateway service based on a status of the headend system and/or the one or more first servers.

9. The system of claim 1, wherein:
    the one or more set top box clients send back a device configuration to the one or more head end servers; and
    a backup configuration is restored on the one or more set top box clients from the one or more head end servers based on the device configuration.

10. The system of claim 1, wherein parental control settings defined for the one or more set top box clients are enforced on non-set top box devices.

11. The system of claim 1, wherein:
    the persistent connection is used to synchronize one or more playlists from one or more set top box clients across a user's account.

12. The system of claim 1, wherein:
    a pause point from viewing media content via the one or more set top box clients is synchronized with viewing the media content on non-set top box devices.

13. A computer-implemented method for messaging between a headend system and a set top box, comprising:
    determining and providing, by a distributor, an assigned communication identifier and an assigned server host address, that corresponds to one of one or more first servers, to each of one or more set top box clients;
    maintaining a persistent connection between the one or more first servers and the one or more set top box clients;
    providing, in the one or more first servers, messaging, presence, and routing features via the persistent connection;
    providing a gateway for one or more headend servers to communicate with the one or more set top box clients through the one or more first servers; and
    providing, via a server controller, administrative graphical user interfaces for operators to maintain the persistent connection, to monitor and control health checks and configuration changes, and collect statistics for the distributor, one or more first servers, and the gateway; and wherein the gateway service and server controller are maintained at the data center.

14. The computer-implemented method of claim 13, wherein:
the distributor comprises a Jabber identification (JID) distributor; and
the assigned communication identifier is a JID identifier uniquely assigned to each of the one or more set top box clients.

15. The computer-implemented method of claim 13, wherein:
the one or more first servers comprise Extensible Messaging and Presence Protocol (XMPP) servers;
the messaging comprises XMPP messaging;
the gateway comprises an XMPP gateway service;
the server controller comprises an XMPP server controller; and
the one or more set top box clients comprise XMPP enabled set top box clients.

16. The computer-implemented method of claim 13, further comprising:
authenticating, via the distributor, the one or more set top box clients with an authentication server.

17. The computer-implemented method of claim 13, wherein the distributor determines and provides the assigned communication identifier and server host address to each of one or more set top box clients based on a user account number and zip code information.

18. The computer-implemented method of claim 13, further comprising:
authenticating the one or more set top box clients prior to maintaining the persistent connection and providing the messaging, presence, and routing features.

19. The computer-implemented method of claim 13, further comprising:
initiating commands, from a device notification and data service (DNDS), to be sent to a group of the one or more set top box clients through the one or more first servers.

20. The computer-implemented method of claim 13, further comprising:
providing, from the server controller, a policy update to the distributor and the gateway based on a status of the headend system and/or the one or more first servers.

* * * * *